United States Patent
De Wergifosse

(10) Patent No.: US 11,859,558 B2
(45) Date of Patent: Jan. 2, 2024

(54) DEVICE FOR DRIVING A GENERATOR OF AN AIRCRAFT TURBOMACHINE AND METHOD FOR REGULATING THE SPEED OF SUCH A GENERATOR

(71) Applicant: SAFRAN AIRCRAFT ENGINES, Paris (FR)

(72) Inventor: Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 70 days.

(21) Appl. No.: 17/619,362

(22) PCT Filed: Jul. 23, 2020

(86) PCT No.: PCT/FR2020/051353
§ 371 (c)(1),
(2) Date: Dec. 15, 2021

(87) PCT Pub. No.: WO2021/019163
PCT Pub. Date: Feb. 4, 2021

(65) Prior Publication Data
US 2022/0260019 A1  Aug. 18, 2022

(30) Foreign Application Priority Data
Jul. 26, 2019 (FR) .................................. 1908553

(51) Int. Cl.
*F02C 7/32* (2006.01)
*F02C 7/36* (2006.01)
(Continued)

(52) U.S. Cl.
CPC .................. *F02C 7/32* (2013.01); *F02C 7/36* (2013.01); *F05D 2220/323* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 11,168,617 B2 * | 11/2021 | Kupratis | F01D 15/12 |
| 2009/0007569 A1 * | 1/2009 | Lemmers, Jr. | F02C 7/36 60/39.163 |

(Continued)

FOREIGN PATENT DOCUMENTS

| | | |
|---|---|---|
| EP | 2216530 A2 | 8/2010 |
| EP | 2696058 A1 | 2/2014 |
| FR | 3062421 A1 | 8/2018 |

OTHER PUBLICATIONS

International Search Report dated Nov. 10, 2020, issued in corresponding International Application No. PCT/FR2020/051353, filed Jul. 23, 2020, 2 pages.
Written Opinion of the International Searching Authority dated Nov. 10, 2020, issued in corresponding International Application No. PCT/FR2020/051353, filed Jul. 23, 2020, 6 pages.
(Continued)

*Primary Examiner* — Binh Q Tran
(74) *Attorney, Agent, or Firm* — Christensen O'Connor Johnson Kindness PLLC

(57) ABSTRACT

A device for driving an integrated generator from an accessories relay box of a turbomachine. The device includes first and second electric motors arranged to transfer electric power from one to the other, one or more controllers configured for controlling said electric motors, and an epicyclic reduction gear train. The gear train includes a first element intended to be coupled to the accessories relay box, a second element intended to be coupled to the generator, and a third element driven to rotate by said first electric motor. The control means are configured to modify the speed of rotation of the third element in such a way that the second element is driven to rotate at a constant speed.

10 Claims, 3 Drawing Sheets

(51) Int. Cl.
  *F16H 1/28* (2006.01)
  *F16H 57/02* (2012.01)
  *F16H 61/66* (2006.01)

(52) U.S. Cl.
  CPC .... *F05D 2220/76* (2013.01); *F05D 2220/766* (2013.01); *F05D 2220/7644* (2013.01); *F05D 2260/403* (2013.01); *F05D 2260/40311* (2013.01); *F05D 2260/53* (2013.01); *F05D 2270/023* (2013.01); *F05D 2270/024* (2013.01); *F05D 2270/04* (2013.01); *F16H 1/2845* (2013.01); *F16H 2057/02034* (2013.01); *F16H 2061/6602* (2013.01); *F16H 2718/02* (2013.01)

(56) References Cited

U.S. PATENT DOCUMENTS

| | | | | |
|---|---|---|---|---|
| 2013/0247539 | A1* | 9/2013 | Hoppe | F02C 7/32 60/39.15 |
| 2017/0369179 | A1* | 12/2017 | Bradbrook | F02C 3/04 |
| 2020/0003126 | A1* | 1/2020 | De Wergifosse | F02C 7/22 |
| 2020/0070988 | A1* | 3/2020 | Harvey | F02C 3/067 |
| 2020/0141327 | A1* | 5/2020 | Redford | F02C 3/04 |
| 2020/0158213 | A1* | 5/2020 | Leque | F02K 3/06 |
| 2020/0240331 | A1* | 7/2020 | Kupratis | F02C 7/275 |
| 2020/0307818 | A1* | 10/2020 | Dubreuil | B64D 27/24 |

OTHER PUBLICATIONS

International Preliminary Report on Patentability dated Feb. 1, 2022, issued in corresponding International Application No. PCT/FR2020/051353, filed Jul. 23, 2020, 1 page.

* cited by examiner

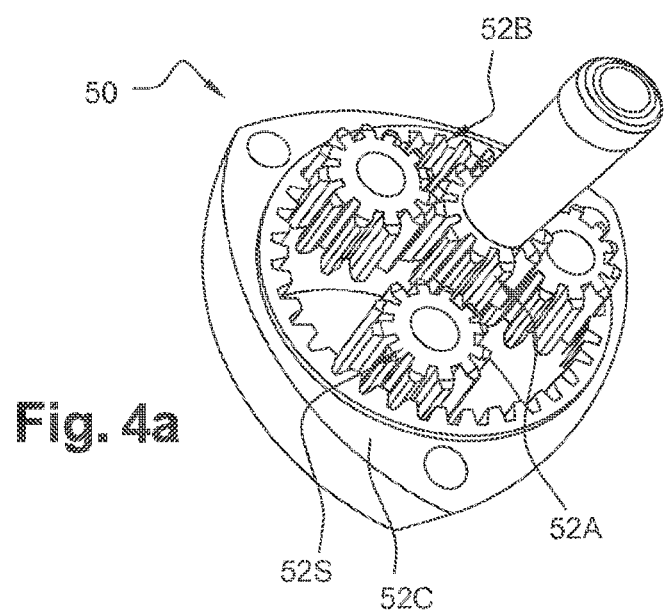
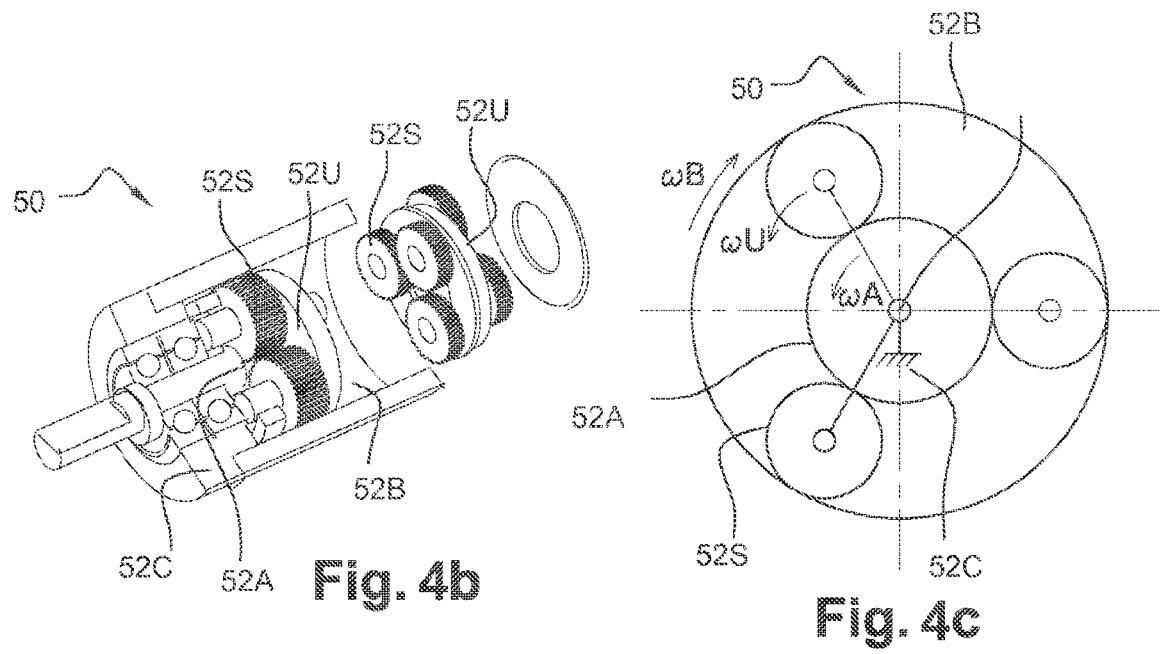

DEVICE FOR DRIVING A GENERATOR OF AN AIRCRAFT TURBOMACHINE AND METHOD FOR REGULATING THE SPEED OF SUCH A GENERATOR

TECHNICAL FIELD OF THE INVENTION

The invention relates to the field of turbomachines, and more specifically to a device for driving an integrated generator of a turbomachine from an accessory gear box of the turbomachine. The invention also relates to a method for regulating the speed of the integrated generator of the turbomachine.

BACKGROUND

The technical background comprises, in particular, the documents FR 3 062 421 A1, EP 2 216 530 A2, EP 2 216 530 A3 and EP 2 696 058 A1.

In a known way, a turbomachine installed on an aircraft is equipped with an Integrated Drive Generator (IDG) configured to deliver an electrical power at a constant frequency, for example an electrical power of 115 V in three-phase alternative current at 400 Hz.

The generator is designed to receive mechanical energy by rotating its input shaft at different speeds, and to transform this mechanical energy into electrical energy. Typically, the generator is driven by an output shaft of an Accessory Gear Box (AGB) on the turbomachine. The rotational speed of the input shaft of the generator and the output speed of the accessory gear box are therefore linked by a fixed reduction ratio to the variable speeds of the turbomachine. To obtain a constant frequency, the generator must be driven at a constant speed.

For this purpose, a control device of the speed between the output shaft of the accessory gear box and the input shaft of the generator can be installed, in order to maintain a constant speed of the rotation axis of the generator.

In particular, a generator delivering electrical power at a constant frequency is traditionally equipped with a hydromechanical differential device to ensure a control of the constant speed of the generator.

The control device of the speed usually consists of a fixed displacement hydraulic motor. The speed of the hydraulic motor is controlled by a pressure control loop. The transfer of the hydraulic power is achieved by a variable displacement hydraulic motor, where the displacement is adjusted to ensure the conservation of the flow rate between the two equipment. For the pressure regulation, the hydraulic system is equipped with a dissipative pressure regulator.

However, the mechanical power drawn off from the accessory gear box is not equal to the power delivered by the generator.

In addition, the hydromechanical device has disadvantages. In particular, the overall efficiency of the fixed or variable displacement hydraulic motor is low, and in particular close to 80%, due to internal leaks and friction. In addition, there are pressure losses at the level of the hydraulic device controlling the variable displacement hydraulic motor and dissipative losses at the level of the pressure regulator controlling the speed of the fixed displacement hydraulic motor. Furthermore, the reversible operation in both quadrants (positive and negative speed, motor/generator) does not allow for an optimization in terms of efficiency, and as a result, the efficiency is less than 80%. This hydromechanical device is also unreliable because adjusting the speed of the generator involves operating the hydraulic motors over a wide speed range. Thus, at low or high speeds, the efficiencies are affected and the risk of wear is greater.

The purpose of the invention is to propose a solution allowing to remedy at least some of these disadvantages.

SUMMARY OF THE INVENTION

To this end, the invention relates to a device for driving an input shaft of an integrated generator of an aircraft turbomachine from an output shaft of an accessory gear box of the turbomachine, characterized in that the driving device comprises:
   first and second electric motors,
   control means configured to control said first and second electric motors, said first and second electric motors being arranged to transfer electrical power from one to the other, and
   an epicyclic reduction gear train comprising three elements, a central planetary gear, an external ring gear and a planet carrier whose planet gears mesh with said planetary gear and said ring gear, said three elements being rotatable about an axis of the gearbox, a first one of said three elements being intended to be coupled to the output shaft of the accessory gear box, a second one of said three elements being intended to be coupled to the input shaft of the generator, a third one of said three elements being driven in rotation by said first electric motor,
and wherein said control means are configured to change the rotational speed of the third of said three elements so that the second of said three elements is driven in rotation at a constant speed.

Since the rotational speed of the input shaft of the integrated generator is generally variable, in order to adjust the output speed of the generator to a constant value, the driving device comprises an epicyclic reduction gear train to incorporate an additional degree of adaptation. The transmission by the epicyclic reduction gear train allows the shaft driven by the accessory gear box to be connected to the generator and the first electric motor, and thus to adjust the speed of the generator to a constant value. The epicyclic reduction gear train acts as a differential, allowing to link these three pieces of equipment and to modulate the speed of the input shaft of the generator. Thus, the control of the speed of the first electric motor allows to ensure a constant output speed of the generator for an input speed on the side of the accessory gear box.

The second electric motor allows to ensure the transfer of electrical power to the first electric motor.

The driving device according to the invention is advantageously purely electrical and incorporates an electrical power transfer between the first and second electric motors, which allow to eliminate the dissipative losses present in the driving devices according to the prior art.

The output speed of the generator is advantageously maintained constant without drawing additional power from the output shaft of the accessory gear box of the turbomachine. Thus, the power drawn off from the output shaft of the accessory gear box is completely converted into electrical power.

The driving device according to the invention allows to work in both quadrants, without any penalty in terms of efficiency of the electric motors.

Furthermore, the driving device is reliable, in particular thanks to the redundancy of the electric motors, unlike the devices according to the prior art in which hydraulic redundancy is not technically conceivable.

In addition, the number of components of the device is limited, as the driving device does not comprise a pressure regulator device or a displacement regulator device as in the prior art.

The first electric motor may be a motor/generator adapted to operate without power transfer with a second motor. In particular, the first electric motor may be equipped with a battery.

Preferably, the first and second electric motors are asynchronous.

The driving device may comprise at least one reversible power converter arranged between the first and second electric motors so as to transfer electrical power reversibly from one to the other.

According to a first embodiment, the first of said three elements is the planet carrier coupled to the accessory gear box (AGB), the second of said three elements is the ring gear coupled to the generator, and the third of said three elements is the planetary gear coupled to the first electric motor. In this configuration, the second of said three elements may also be coupled to the second electric motor.

According to a second embodiment, the first of the three elements is the planet carrier coupled to the accessory gear box (AGB), the second of said three elements is the ring gear coupled to the generator, and the third of said three elements is the planetary gear coupled to the first electric motor. In this configuration, the first of said three elements may also be coupled to the second electric motor.

According to a third embodiment, the first of the three elements is the ring gear coupled to the accessory gear box (AGB), the second of said three elements is the planet carrier coupled to the generator, and the third of said three elements is the planetary gear coupled to the first electric motor. In this configuration, the first of said three elements may also be coupled to the second electric motor.

The invention also relates to a turbomachine, in particular for an aircraft, comprising:
an accessory gear box having an output shaft,
an integrated generator having an input shaft, and being characterized in that it also comprises a driving device according to the invention.

The invention also relates to a method for regulating the speed of an integrated generator of a turbomachine according to the invention in an aircraft, comprising a step of modifying the speed of the third of the three elements by controlling the first electric motor by means of control means so that the second of said three elements is driven in rotation at a constant speed.

BRIEF DESCRIPTION OF FIGURES

The invention will be better understood and other details, characteristics and advantages of the present invention will become clearer from the following description made by way of non-limiting example and with reference to the attached drawings, in which:

FIGS. 4a, 4b and 4c represent exploded views and a diagram of an epicyclic reduction gear train of a driving device according to the invention.

The elements having the same functions in the different implementations have the same references in the figures.

DETAILED DESCRIPTION OF THE INVENTION

Figure 1:
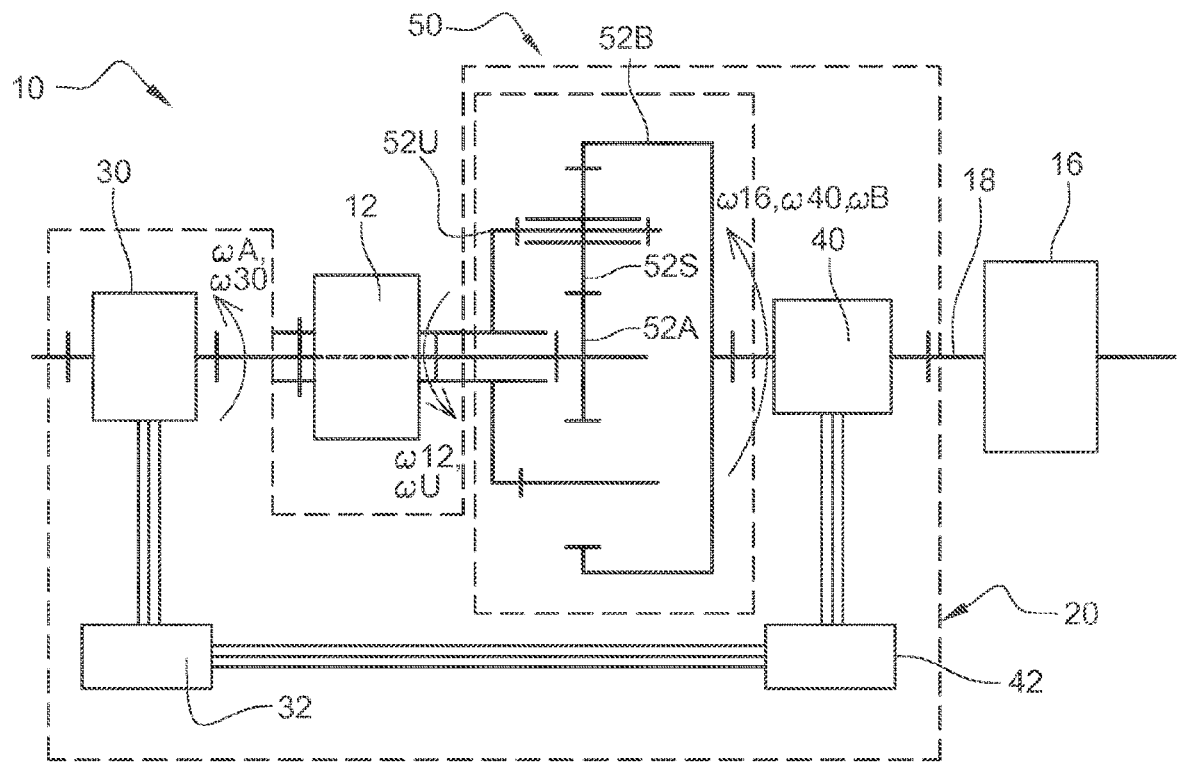
FIG. 1 represents very schematically a first kinematic configuration of a driving device of a turbomachine according to the invention.
Figure 2:
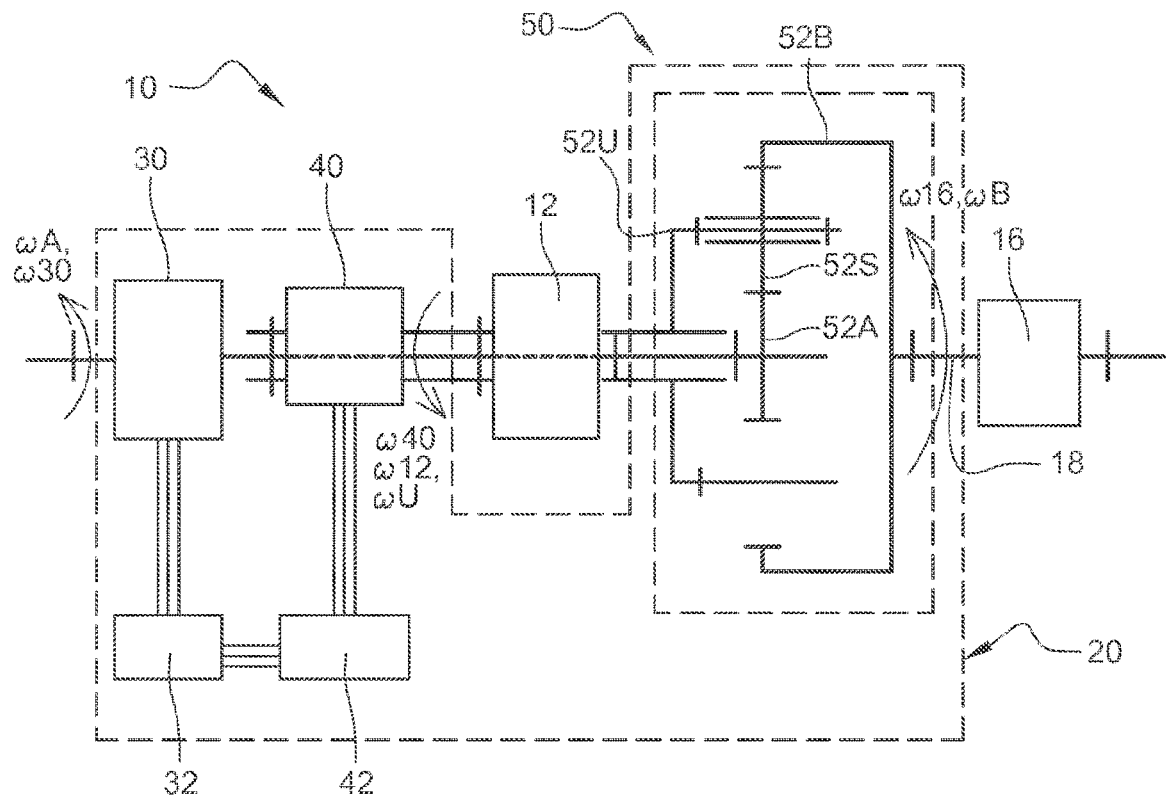
FIG. 2 represents very schematically a second kinematic configuration of a driving device of a turbomachine according to the invention.
Figure 3:
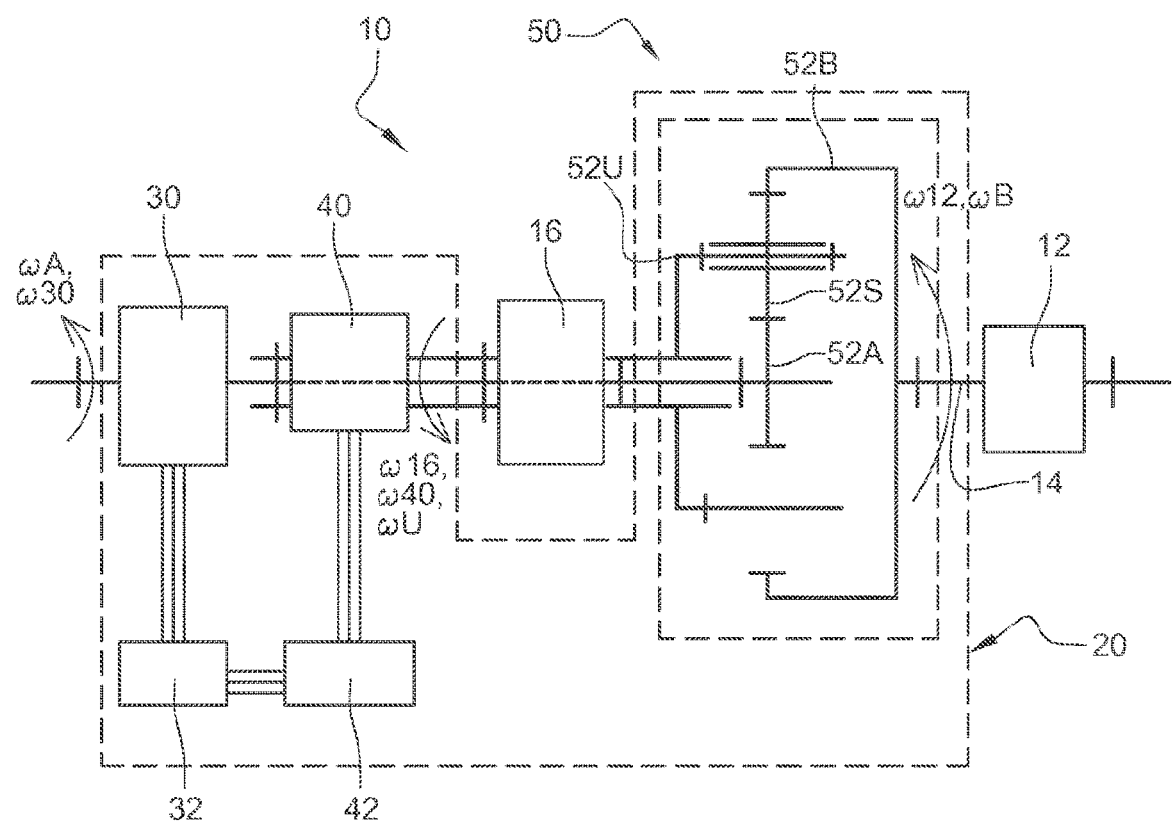
FIG. 3 represents very schematically a third kinematic configuration of a driving device of a turbomachine according to the invention.

FIGS. 1 to 3 show a turbomachine 10, comprising a driving device 20 according to the invention.

The turbomachine 10 comprises an accessory gear box 12 which is configured to be driven by an engine shaft. The accessory gear box 12 may comprise a plurality of gear trains connected to output shafts for driving various equipment. Here, one of the output shafts 14 of the gearbox drives an integrated generator 16 via the driving device 20.

The turbomachine 10 also comprises the integrated generator 16. The generator 16 allows to convert mechanical energy from the rotation of its input shaft 18 into electrical energy.

The driving device 20 comprises a first electric motor 30, and control means configured to control the first electric motor 30. The first electric motor 30 may be a motor/generator. In other words, the first electric motor 30 may be configured to operate in a generator mode by supplying electrical energy and to operate in a motor mode by recovering electrical energy. In particular, the first electric motor 30 may be equipped with a battery.

The driving device 20 comprises a second electric motor 40, and control means configured to control the second electric motor 40. The second electric motor 40 may be a motor/generator.

The first and second electric motors 30, 40 are arranged to transfer electrical power from one to the other.

Preferably, the first and second electric motors 30, 40, are asynchronous in alternative current.

The driving device 20 may comprise reversible power converters 32, 42 arranged between the first and second electric motors 30, 40 so as to reversibly transfer electrical power from one to the other. More specifically, the first electric motor 30 is connected to a first power converter 32, and the second electric motor 40 is connected to a second power converter 42, and the first and second power converters 32, 42 are connected together. A power converter can be an inverter or a straightener.

The driving device 20 also comprises an epicyclic reduction gear train 50. The properties of the epicyclic reduction gear train are used to adapt the speed of rotation of the input shaft 18 of the generator 16.

FIGS. 4a, 4b and 4c show an epicyclic reduction gear train 50.

The epicyclic reduction gear train 50 comprises a central planetary gear 52A, arranged to be rotatable about the axis of the gearbox at a rotational speed, denoted $\omega A$, and a planet carrier 52U arranged to be rotatable about the axis of the gearbox at a rotational speed, denoted $\omega U$.

The epicyclic reduction gear train 50 also comprises planet gears 52S which mesh with the central planetary gear 52A and are carried by a planet carrier 52U.

The epicyclic reduction gear train 50 also comprises an external ring gear 52B arranged to be rotatable about the axis of the gearbox at a rotational speed, denoted $\omega B$, and with which the planet gears 52S also mesh.

In the epicyclic reduction gear train 50, the three elements, namely the central planetary gear 52A, the planet carrier 52U and the ring gear 52B, are rotatable about the axis of the gearbox. For example, the ring gear 52B is free to rotate within a fixed casing 52C that is configured to protect the gearbox 50.

The operation of the epicyclic reduction gear train 50 is governed by the Willis formula. This is a two-degree-of-freedom mechanism, in which the knowledge of the rotational speeds of two elements among the central planetary gear 52A, the planet carrier 52U and the ring gear 52B, allows the calculation of the rotational speed of the third element.

The Willis formula is expressed by the following equations:

$$\frac{\omega A - \omega U}{\omega B - \omega U} = k \quad [\text{Math 1}]$$

or $$\omega A - k \times \omega B + (k - 1) \times \omega U = 0 \quad [\text{Math 2}]$$

with ωA the rotational speed of the central planetary gear 52A, ωU the rotational speed of the planet carrier 52U, ωB the rotational speed of the ring gear 52B, and the factor k, also referred to as ratio, a constant determined by the geometry of the gears.

For the gearbox in FIG. 4, the factor k follows the following equation:

$$k = -\frac{ZB}{ZA} \quad [\text{Math 3}]$$

where ZA is the number of teeth of the central planetary gear 52A and ZB is the number of teeth of the ring gear 52B. The factor k is therefore negative with a modulus less than 1.

The output shaft 14 of the accessory gear box 12 is coupled to one of the three elements of the gearbox 50, the input shaft 18 of the generator 16 is coupled to a second element of the gearbox 50, and the first electric motor 30 is coupled to the third element of the gearbox 50 to control the rotational speed of the latter.

According to the invention, the control means are configured to change the rotational speed of the third element, i.e. the rotational speed ω30 of the first electric motor 30, so that the second element, i.e. the generator 16, is driven in rotation at a constant speed.

In order to obtain a constant rotational speed of the input shaft 18 of the generator 16 for a given rotational speed of the output shaft 14 of the accessory gear box 12, it is possible to vary the rotational speed of the third element of the gearbox 50.

Six kinematic combinations are possible for positioning the three pieces of equipment, namely the accessory gear box 12, the generator 16 and the first electric motor 30, relative to the three elements of the epicyclic reduction gear train 50.

The second electric motor 40 is also coupled to one of the elements of the gearbox 50 that is not coupled to the first electric motor 30. The second electric motor 40 may be positioned on the axis of the generator 16 or on the axis of the accessory gear box. The first electric motor 30 and the second electric motor 40 each comprise a stator and a rotor. The first and second electric motors 30, 40 are controllable in terms of the torque applied to their rotor and the rotational speed ω30, ω40 of their rotor. The torque and the speed of each electric motor 30, 40 are then controlled by the electrical power and the frequency of the current sent by the power converters 32, 42 dedicated to each.

Furthermore, the second electric motor 40 is electrically linked to the first electric motor 30 by means of the reversible power converters 32, 42 to transfer power from one to the other.

The position of the second electric motor 40 doubles the number of possible combinations for the driving device 20. This results in twelve combinations listed in the table below.

Table 1 also shows the function giving the rotational speed ω16 of the generator 16 from the rotational speed ω12 of the output shaft 14 of the accessory gear box 12 and the rotational speed ω30 of the first electric motor 30. The rotational speed ω40 of the second electric motor 40 is determined by the rotational speed of the equipment with which it is coupled in series on the gearbox 50, either the shaft of the generator 16 or the output shaft 14 of the accessory gear box 12. In this table, the option 1 corresponds to cases where the second electric motor 40 is coupled in series with the generator 16 on the same element of the gearbox 50, and the option 2 corresponds to cases where the second electric motor 40 is coupled in series with the output shaft of the accessory gear box 12 on the same element of the gearbox 50.

TABLE 1

| Connection accessory gear box/generator/first electric motor | | | Generator speed | Connection second electric motor | |
|---|---|---|---|---|---|
| | | | | Option 1 | Option 2 |
| Accessory gear box 12 connected to the planet carrier 52U | | | | | |
| | First electric motor 30 | Generator 16 | | | |
| 1A | Ring gear 52B | Planetary gear 52A | $\omega 16 = (1 - k) \times \omega 12 + k \times \omega 30$ | Planetary gear 52A | Planet carrier 52U |
| 1B | Planetary gear 52A | Ring gear 52B | $\omega 16 = -\omega 12 \times \frac{1-k}{k} + \frac{\omega 30}{k}$ | Ring gear 52B | Plannet carrier 52U |
| Accessory gear box 12 connected to the planet carrier 52B | | | | | |
| | First electric motor 30 | Generator 16 | | | |

TABLE 1-continued

| | Connection accessory gear box/generator/first electric motor | | Generator speed | Connection second electric motor | |
|---|---|---|---|---|---|
| | | | | Option 1 | Option 2 |
| 2A | Planet carrier 52U | Planetary gear 52A | $\omega 16 = k \times \omega 12 + (1 - k) \times \omega 30$ | Planetary gear 52A | Ring gear 52B |
| 2B | Planetary gear 52A | Planet carrier 52U | $\omega 16 = -\omega 12 \times \frac{1-k}{k} + \frac{\omega 30}{1-k}$ | Planet carrier 52U | Ring gear 52B |
| Accessory gear box 12 connected to the planet carrier 52A | | | | | |
| | First electric motor 30 | Generator 16 | | | |
| 3A | Ring gear 52B | Planet carrier 52U | $\omega 16 = \frac{\omega 12}{1-k} - \omega 30 \times \frac{k}{1-k}$ | Planet carrier 52U | Plannet carrier 52A |
| 3B | Planet carrier 52U | Ring gear 52B | $\omega 16 = \frac{\omega 12}{k} - \omega 30 \times \frac{1-k}{k}$ | Ring gear 52B | Plannet carrier 52A |

The torques delivered by the accessory gear box 12, the generator 16, and the first electric motor 30 are connected by a balance expression of the gear train. In particular, a study of the gearbox 50 allows to obtain the following train balance relationship and power balance relationship:

$$CA + CB + CU = 0 \quad \text{[Math 4]}$$

$$\omega A \times CA + \omega B \times CB + \omega U \times CU = 0 \quad \text{[Math 5]}$$

where CA is the torque on the planetary gear 52A, CB is the torque on the ring gear 52B, CU is the torque on the planet carrier 52U, $\omega A$ is the rotational speed of the central planetary gear 52A, $\omega B$ is the rotational speed of the ring gear 52B and $\omega U$ is the rotational speed of the planet carrier 52U.

This results in a torque at the level of the first electric motor 30, and thus a driving or generating power at the level of this motor depending on the direction of the speed and the torque.

The second electric motor 40 is connected in series with the generator 16 or with the accessory gear box 12, and thereby the rotational speed $\omega 40$ of the second electric motor 40 is determined to be equal to that of this equipment.

Thus, the second electric motor 40 provides an additional degree of freedom to the driving device depending on the torque it exerts and which is added to that of the generator 16 or the accessory gear box 12 on the corresponding element of the gearbox 50.

This additional degree of freedom is used to provide a power transfer with the first electric motor 30.

Indeed, without the addition of the second electric motor 40 which allows the transfer of power with the first electric motor 30, the power drawn off from the axis of the accessory gear box 12 would in certain phases of flight of the turbomachine be less than the electrical power delivered by the generator 16 and in certain phases of flight of the turbomachine greater than the requirements of the phase of flight.

In the case of an electrical power delivered by the generator 16 being greater than the power drawn off from the accessory gear box 12, the power gain comes from the electrical power drawn off by the first electric motor in motor mode.

In the case of an electrical power delivered by the generator 16 is less than the power drawn off from the accessory gear box 12, the power loss is drawn off by the first electric motor 30 in generator mode.

In the absence of the second electric motor, the battery of the first electric motor 30 would allow to retrieve the electrical power during the generating phases and to restore this electrical power during the driving phases.

The driving mode of the first electric motor 30 allows it to operate in all four quadrants, in terms of torque and speed.

The overall energy drawn off from the accessory gear box 12 during the entire flight phase then corresponds to the electrical energy delivered by the generator 16.

The choice of parameters such as the ratio k of the epicyclic gear train of the gearbox 50 and the input rotation speed on the side of the accessory gear box 12 must be optimized to meet different constraints, motor speed constraints, maximum power constraints of the electric machines.

Indeed, the driving device 20 depends on several parameters including: the ratio k of the epicyclic gear train of the gearbox 50, the ratio of the rotational speed $\omega 12$ at the output of the accessory gear box 12 with respect to the rotational speed of the engine axis of the turbomachine and the maximum value of the rotational speed $\omega 16$ of the generator 16.

A choice among the twelve configurations must be made by optimizing these parameters to achieve in particular the following objectives:
  having a speed of the generator 16 higher than the speed of the accessory gear box 12;
  reducing the torque of the first electric motor 30 for optimizing the motor size;
  having the speed of the first electric motor 30 as high as possible;
  having the speed of the second electric motor 40 as high as possible;
  optimizing the power transfers between the first electric motor 30 and the second electric motor 40.

Not all combinations in Table 1 will allow to achieve these objectives.

A specific optimization study of each combination is therefore necessary to motivate a choice of implementation on a turbomachine. The combinations described below present various advantages to be considered for an integration in a turbomachine.

FIG. 1 illustrates the "1B-Option 1" configuration in which the accessory gear box 12 is connected to the planet carrier 52U, the generator 16 is connected to the ring gear 52B, and the first electric motor 30 is connected to the central planetary gear 52A. In this configuration, the second electric motor 40 is connected to the ring gear 52B.

This configuration allows to meet the following constraints:
- rotational speed ω16 of the generator 16 higher than the rotational speed ω12 of the accessory gear box 12, in particular due to the connection of the generator 16 to the ring gear 52B;
- reduction of the torque of the first electric motor 30 to optimize the size of the motor, in particular by connecting the first electric motor 30 to the planetary gear 52A;
- the highest possible rotational speed ω30 of the first electric motor 30, in particular by the connection of the first electric motor 30 to the planetary gear 52A; and
- rotational speed ω40 of the second electric motor 40 as high as possible, in particular by the connection of the second electric motor 40 to the ring gear 52B.

In this configuration, the control of the second electric motor 40 is limited to a torque control loop, as its speed is constant, the second electric motor 40 and the generator 16 being connected to the same element of the gearbox 50.

FIG. 2 illustrates the "1B-Option 2" configuration in which the accessory gear box 12 is connected to the planet carrier 52U, the generator 16 is connected to the ring gear 52B, and the first electric motor 30 is connected to the central planetary gear 52A. In this configuration, the second electric motor 40 is connected to the planet carrier 52U.

This configuration allows to meet the following constraints:
- rotational speed ω16 of the generator 16 higher than the rotational speed ω12 of the accessory gear box;
- reducing the torque of the first electric motor 30 to optimize the size of the motor; and
- rotational speed ω30 of the first electric motor 30 as high as possible.

In this configuration, the control of the second electric motor 40 comprises a torque and speed control loop, the second electric motor 40 and the accessory gear box 12 being connected to the same element of the gearbox 50.

The choice of positioning the second electric motor 40 on the axis of the generator 16 (configuration "1B-Option 1") or on the axis of the accessory gear box 12 (configuration "1B-Option 2") depends on the application, and mainly on the layout and the cluttering of the equipment, and on the maximum speed of the turbomachine 10 and the maximum speed of the generator 16 which is delimited by the maximum torque, and therefore by the maximum power.

FIG. 3 illustrates the "2B-Option 1" configuration in which the accessory gear box 12 is connected to the ring gear 52B, the generator 16 is connected to the planet carrier 52U, and the first electric motor 30 is connected to the central planetary gear 52A. In this configuration, the second electric motor 40 is connected to the planet carrier 52U.

The choice of the configuration depends on the power levels of the considered application.

The configurations 1A and 1B, independently of the Option, allow to meet the majority of the applications and the various major constraints.

In the configuration 1B, Option 1 or Option 2, the lack of loss is due to the transfer of electrical power. Indeed, the first electric motor 30 may recover energy in generator mode through the epicyclic reduction gear train 50 and return it to the second electric motor 40, or retrieve energy from the second electric motor 40 and return it in motor mode to the epicyclic reduction gear train 50.

In operation the epicyclic reduction gear train 50 behaves in three different ways.

First, if the speed of the shaft 14 of the accessory gear box 12 is such that the speed of the generator 16 corresponds to the value of the constant speed, the control speed of the first electric motor 30 is zero and the speed of the generator 16 is related to the speed of the shaft 14 of the accessory gear box 12 by the reduction ratio of the epicyclic gear train at zero speed of the first electric motor 30.

Secondly, if the speed of the shaft 14 of the accessory gear box 12 is such that the speed of the generator 16 is greater than the value of the constant speed, the first electric motor 30 is driven to operate in a certain direction of rotation in the generator mode to reduce the speed of the generator 16. The recovered energy is then returned to the second electric motor 40 operating in motor mode.

Third, if the speed of the shaft 14 of the accessory gear box 12 is such that the speed of the generator 16 is less than the requirements of the turbomachine 10, the first electric motor 30 is driven to operate in the other direction of rotation in motor mode to increase the speed of the generator 16. The energy returned to the first electric motor 30 comes from the energy recovered from the second electric motor 40 operating in generator mode.

The power drawn off from the accessory gear box 12 is converted entirely to the power delivered by the generator 16.

Depending on the design and the technology of the motors, preferably asynchronous, the redundancy of the motors to ensure high a reliability has only a small impact on the size of the motors.

The invention also relates to a method for regulating the speed of an integrated generator 16 of a turbomachine 10 as previously described.

The method comprises a step of changing the speed of the third of the three elements by driving the first electric motor 30 by means of the control means so that the second of said three elements, i.e. the generator 16, is driven in rotation at a constant speed.

In particular, the speed of the first electric motor 30 is adapted to the speed of the output shaft of the accessory gear box 12 so that the speed of the generator 16 is constant.

The invention claimed is:

1. A driving device for driving an input shaft of an integrated generator of an aircraft turbomachine from an output shaft of an accessory gear box of the turbomachine, the driving device comprising:
- first and second electric motors each being a motor/generator;
- control means configured to control said first and second electric motors, said first and second electric motors being arranged to transfer electrical power from one to the other; and
- an epicyclic reduction gear train comprising three elements:
  - a central planetary gear,
  - an external ring gear, and
  - a planet carrier,
    - wherein said planet carrier carries planet gears which mesh with said central planetary gear and said external ring gear,
    - wherein said three elements are rotatable about an axis of the epicyclic reduction gear train, a first one of said three elements being coupled to the output shaft of the accessory gear box, a second one of said three elements being coupled to the input shaft of the integrated generator, and a third one of said three elements being suitable to be driven in rotation by said first electric motor, and wherein said control means are configured to change a rotational speed of the third one of said three elements so that the second one of said three elements is driven in rotation at a constant speed.

2. The driving device according to claim 1, wherein the first electric motor is a motor/generator adapted to operate without power transfer with a second motor and to be equipped with a battery.

3. The driving device according to claim 1, wherein said first and second electric motors are asynchronous.

4. The driving device according to claim 1, comprising at least one reversible power converter arranged between said first and second electric motors so as to transfer electrical power reversibly from one to the other.

5. The driving device according to claim 1, wherein the first one of said three elements is the planet carrier coupled to the output shaft of the accessory gear box, the second one of said three elements is the external ring gear coupled to the integrated generator, and the third one of said three elements is the central planetary gear coupled to the first electric motor, and wherein the second one of said three elements is also coupled to said second electric motor.

6. The driving device according to claim 1, wherein the first one of said three elements is the planet carrier coupled to the output shaft of the accessory gear box, the second one of said three elements is the external ring gear coupled to the integrated generator, and the third one of said three elements is the central planetary gear being intended to be coupled to the first electric motor, and wherein the first one of said three elements is also coupled to said second electric motor.

7. The driving device according to claim 1, wherein the first one of said three elements is the external ring gear being coupled to the output shaft of the accessory gear box, the second one of said three elements is the central planet carrier coupled to the integrated generator, and the third one of said three elements is the central planetary gear coupled to the first electric motor, and wherein the second one of said three elements is also coupled to said second electric motor.

8. A turbomachine, comprising:
an accessory gear box having an output shaft;
an integrated generator having an input shaft; and
the driving device according to claim 1.

9. A method for regulating a speed of an integrated generator of a turbomachine in an aircraft, the turbomachine having an accessory gear box with an output shaft, an integrated generator with an input shaft, and the driving device according to claim 1, the method comprising a step of modifying the speed of the third of the three elements by controlling the first electric motor so that the second of said three elements is driven in rotation at a constant speed.

10. A device for driving an input shaft of an integrated generator of an aircraft turbomachine from an output shaft of an accessory gear box of the turbomachine, the driving device comprising:
first and second electric motors each being a motor/generator, the first and second electric motors being arranged to transfer electrical power from one to the other; and
an epicyclic reduction gear train comprising three elements:
a central planetary gear,
an external ring gear, and
a planet carrier
wherein said planet carrier carries planet gears which mesh with said central planetary gear and said external ring gear,
wherein said three elements being rotatable about an axis of the epicyclic reduction gear train, a first one of said three elements being coupled to the output shaft of the accessory gear box, a second one of said three elements coupled to the input shaft of the integrated generator, and a third one of said three elements being driven in rotation by said first electric motor,
wherein the first and/or second motor is controllable to change a rotational speed of the third of said three elements so that the second of said three elements is driven in rotation at a constant speed.

* * * * *